US006717125B2

(12) United States Patent
Schoeppe

(10) Patent No.: US 6,717,125 B2
(45) Date of Patent: Apr. 6, 2004

(54) ARRANGEMENT AND METHOD FOR FOCUS MONITORING IN A MICROSCOPE WITH DIGITAL IMAGE GENERATION, PREFERABLY IN A CONFOCAL MICROSCOPE

(75) Inventor: Guenter Schoeppe, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 5 days.

(21) Appl. No.: 10/243,238

(22) Filed: Sep. 12, 2002

(65) Prior Publication Data

US 2003/0075667 A1 Apr. 24, 2003

(30) Foreign Application Priority Data

Sep. 13, 2001 (DE) ........................................ 101 45 056

(51) Int. Cl.[7] ................................................ G02B 7/04
(52) U.S. Cl. .................... 250/201.3; 250/234; 359/383
(58) Field of Search .......................... 250/201.2, 201.3, 250/201.4, 201.5, 201.8, 202, 216, 234, 236; 356/609, 624; 359/368, 372, 383, 389

(56) References Cited

U.S. PATENT DOCUMENTS 4,852,955 A * 8/1989 Doyle et al. ................ 359/355
2003/0164440 A1 * 9/2003 Czarnetzki et al. ...... 250/201.3
2003/0179386 A1 * 9/2003 Santamato et al. ......... 356/614

* cited by examiner

*Primary Examiner*—Kevin Pyo
(74) *Attorney, Agent, or Firm*—Reed Smith LLP

(57) ABSTRACT

Arrangement and method for focus monitoring in a microscope with digital image generation, preferably in a confocal microscope. The arrangement provides an additional, rotatably supported transparent optical component in the known construction of a microscope in front of a main beam splitter arranged in the beam path in the area of a parallel illumination beam path. According to the method, the images required for focus monitoring are recorded with a transparent optical component inclined by angle $+\alpha$ or $-\alpha$. The images are checked for correlation of the image contents in the direction of beam displacement by pixel-by-pixel displacement. The determined displacement $\Delta s$ at optimum correlation represents a measurement of the instantaneous focusing or defocusing. The suggested solution for focus monitoring is applicable with slight adaptations for all microscopes outfitted with digital image-generating methods and arrangements. In confocal microscopes, applicability to defocusing is limited in a range of about 5 to $8\times\lambda/NA^2$.

14 Claims, 5 Drawing Sheets a) Image section of the recorded images: e.g., 512 x 16 pixels b) Column averaging c) Compensation of illumination differences d) Scaling of the images e) Subtraction of the image contents in pixel-by-pixel displacement Displacement by +3 pixels

ARRANGEMENT AND METHOD FOR FOCUS MONITORING IN A MICROSCOPE WITH DIGITAL IMAGE GENERATION, PREFERABLY IN A CONFOCAL MICROSCOPE

CROSS-REFERENCE TO RELATED APPLICATIONS

This application claims priority of German Application No. 101 45 056.7, filed Sep. 13, 2001, the complete disclosure of which is hereby incorporated by reference.

BACKGROUND OF THE INVENTION a) Field of the Invention

The present invention is directed to an arrangement and a method by which the focus adjustment in microscopes with digital image generation, preferably in confocal microscopes, can be monitored and tracked.

b) Description of the Related Art

Various solutions are known from the prior art for determining and tracking the optimum focal plane in microscopes.

A method for determining the optimum focal plane evaluates the beam reflected by the object. The optimum focus position is achieved at maximum intensity of the reflected beam. For this purpose, according to WO 00/08415, a plurality of light spots with different focal planes are generated. The arrangement described in GB 2 321 517 for confocal microscopes also provides for the evaluation of the radiation reflected by the object for detecting the optimum focus position. These solutions are disadvantageous in that it is sometimes very time-consuming to determine the actual optimum focal plane. Numerous measurements are required for this purpose because the value of the optimum focus position can only be determined by approximation.

Further, solutions are known from the prior art in which light from a spectral range that is not used for examination is used for autofocusing. An example of this is the IR autofocus system. The essential disadvantage in solutions providing for the use of main optics for the IR autofocus system consists in that the main optics must be usable for a very broad spectral range which, in some cases, may extend from the DUV (deep ultraviolet) range to the IR range. An objective which is suitable for this purpose, such as that described in DE 199 31 949, can only be realized at a very high manufacturing cost.

A solution in which the autofocus system uses separate optics and not the main optics system is described in DE 199 19 804. This solution uses a secondary laser source for focus monitoring. The overall arrangement is substantially more extensive and complicated as a result of the additional arrangement for focus monitoring. Further, it is disadvantageous that the optimum focal plane must be known because the autofocus system only compares the instantaneous beam deflection to the ideal beam deflection.

Also, the technical expenditure in the solution described in WO 99/03011 is substantially increased by the additional optical elements required for focus monitoring. In this case, focus monitoring is carried out by the beam offset generated in defocusing by repeated reflection at the different optical surfaces.

The technical solutions known from the prior art have the disadvantages that the required additional light source results in a more complicated technical arrangement, that a large number of measurements are required and/or that focus monitoring is usually only possible with reflecting objects.

OBJECT AND SUMMARY OF THE INVENTION

Therefore, it is the primary object of the present invention to develop a method and an arrangement suited to implement this method for focus monitoring in microscopes with digital image generation, preferably in confocal microscopes, without adding substantially to the complexity of the microscope construction and in which, if possible, the existing illuminating and image evaluating devices can be used to monitor the focal plane. The focus monitoring should be applicable independent from the (transparent, reflecting or fluorescing) object to be examined. Moreover, it should be possible to monitor the focal plane between normal work processes in a very fast and simple manner without altering the construction.

According to the invention, this object is met by the arrangement and the method for focus monitoring in that a suitably dimensioned rotatable plane plate is arranged in front of an existing main beam splitter in an area with parallel illumination beams, the axis of rotation of the plane plate being situated in relation to the specimen in such a way that a displacement of the beam bundle is carried out in the principal scanning direction or principal image direction during rotation. The images required for focus monitoring are recorded with a high zoom and with a pinhole having an aperture greater than one Airy. A first image is recorded with a plane plate inclined by angle $+\alpha$ and a second image is recorded with a plane plate inclined by angle $-\alpha$. These images are checked for correlation to the image contents in the direction of beam displacement by pixel-by-pixel displacement. The determined displacement $\Delta s$ at optimum correlation is a measurement of the instantaneous focusing or defocusing. For a displacement $\Delta s \neq 0$, defocusing is at a distance proportional to $\Delta s$.

The suggested method for focus monitoring and the arrangement provided for implementing this method are applicable with slight adaptations for all microscopes outfitted with digital image-generating methods and arrangements. In confocal microscopes, applicability to defocusing is limited in a depth range of about 5 to $8 \times \lambda / NA^2$.

The invention will be described in the following with reference to two embodiment examples.

DESCRIPITION OF THE PREFERRED EMBODIMENTS

Figure 1:
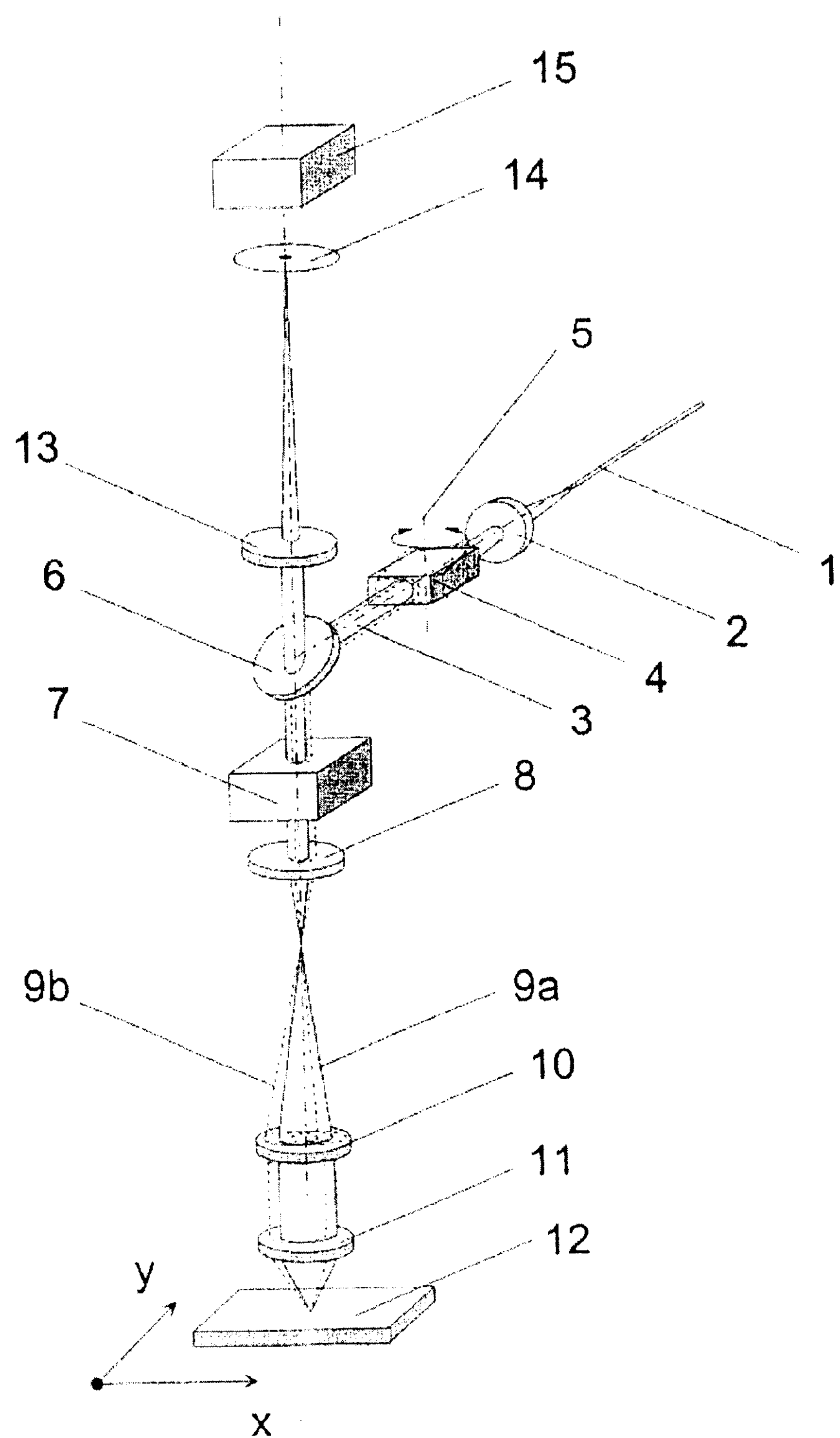
FIG. 1 is a schematic view showing the construction of a confocal laser scanning microscope with the arrangement according to the invention.

In the arrangement for focus monitoring in a confocal microscope shown in FIG. 1, the illumination light 1 proceeding from the laser serving as illumination source reaches the specimen 12 via a collimator 2, a main beam splitter 6 which is constructed as a dichroic splitter, a scanning unit 7, a scanning objective 8, a tube lens 10, and an objective 11. The beam reflected by the specimen 12 reaches the detector 15 via the objective 11, the tube lens 10, the scanning objective 8, the scanning unit 7, the main beam splitter 6, the pinhole objective 13 and the pinhole 14. In addition to this arrangement of a known confocal microscope, a. transparent optical component 4 with parallel beam entrance and beam exit surfaces is arranged in the area of the parallel illumination beam path 3 in front of the main beam splitter 6 in such a way that the mean perpendicular of the beam entrance surface lies parallel to the centroid of the illumination light 1. This position will be referred to in the following as the basic position. The transparent optical component 4 is, e.g., a plane plate or a cube with an edge length of 10 mm and is rotatable by means of a centrally controlled motor, preferably a stepping motor. During rotation, the mean perpendicular of the beam entrance surface encloses an angle $\alpha$ with the centroid of the illumination light 1. The axis of rotation 5 of the transparent optical component 4 is preferably situated in relation to the specimen 12 in such a way (in direction of the y-axis) that a displacement of the beam bundle is carried out in the main scanning direction (x-axis) of the scanning unit 7 when rotated by angle $\alpha$. The beam bundle is accordingly displaced from position 9*a* to position 9*b*. The control of the transparent optical component 4, the processing of the recorded images, the acquisition of all output data, and the calculation and evaluation of the results are carried out by a central controlling and evaluating unit (not shown).

In the method according to the invention for focus monitoring in a confocal laser scanning microscope, the image section contains the relevant object data. The individual method steps are described with reference to FIG. 2. An image section with about 16 rows and 512 columns is sufficient for the method (see a) in FIG. 2). The images required for focus monitoring are recorded at a high zoom and a pinhole 14 which is opened to approximately 4 to 5 Airy. A high zoom means that a smaller object area is imaged in the selected image section of 512×16 pixels. In a laser scanning microscope, this is achieved by decreasing the scanning angle of the scanning unit 7, namely, until the image length in the intermediate image plane is about 1 mm. During normal image processing, the transparent optical component 4 remains in its basic position and is not rotated, i.e., the mean perpendicular of the beam entrance surface lies parallel to the centroid of the illumination light 1. The transparent optical component 4 is rotated for monitoring focus such that the mean perpendicular of the beam entrance surface encloses an angle $\alpha$ with the centroid of the illumination light 1.

A first image is recorded with the transparent optical component 4 rotated by angle $\alpha_1 \approx 20°$ and a second image is recorded with the transparent optical component 4 rotated by angle $\alpha_2 \approx -20°$. A third image is recorded, in addition, also with the transparent optical component 4 rotated by angle $\alpha_1 \approx +20°$, for suppression of drift influences. A condition for the images to be recorded is: $\alpha_1 = -\alpha_2$.

The average column value determined from the first and third images is checked by the central controlling and evaluating unit for correlation of image contents in the direction of the beam displacement by pixel-by-pixel displacement.

Figure 2:
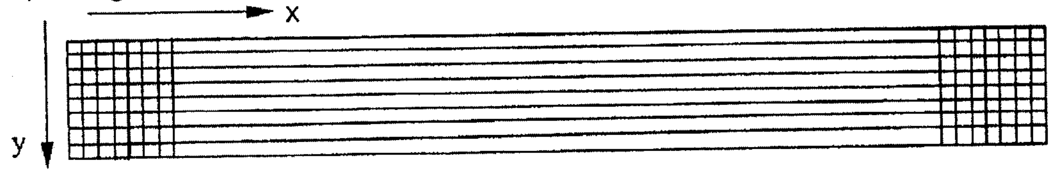
FIG. 2 is a schematic view of the method steps according to the invention.
Figure 2:
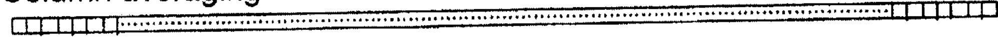
Figure 2:
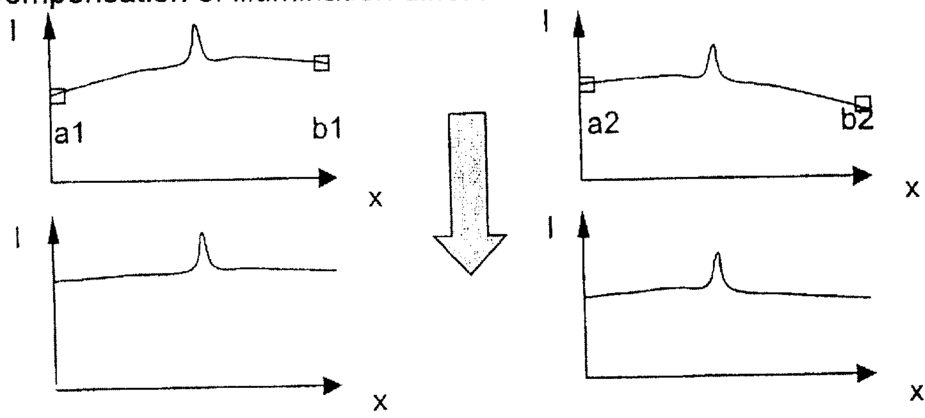
Figure 2:
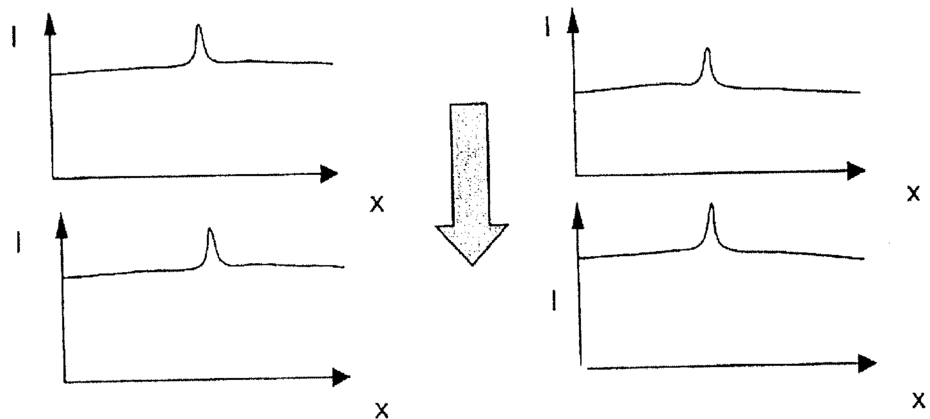
Figure 2:
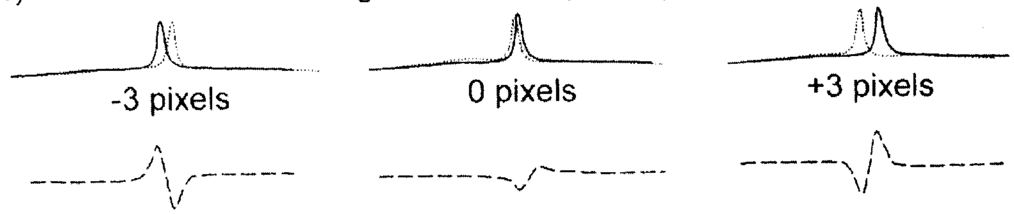

In step b) of FIG. 2, the quantity of data of the two image sections to be compared is reduced (from 512×16 to 512×1) by averaging the columns. In the next step c), the differences in illumination between the right-hand and left-hand image border are compensated mathematically by a shading correction using a lowpass of approximately 10–15 pixels. This is carried out by calculating and compensating the rise in the intensity functions of the two images. Depending on whether the maximum is at $a_n$ or at $b_n$, the formula for determining the rise changes:

$$A = \frac{b_n - a_n}{bn} \text{ or } A = \frac{a_n - b_n}{a_n}$$

The calculation is carried out for the two images to be compared. As a result, the image contents have the same rise and their differences in illumination are accordingly compensated. The minimum and maximum brightness are determined in these corrected images, and the images are accordingly scaled. For this purpose, the values of all pixels of every image are summed ($\Sigma_1$ and $\Sigma_2$) according to step d). Next, every pixel of the first image is multiplied by the factor ($256*512/\Sigma_1$) and every pixel of the second image is multiplied by the factor ($256*512/\Sigma_2$). The number 256 is the scaling factor and 512 is the number of pixels in an image. The existing differences in brightness are compensated by means of this method step. The contents of these images which are corrected for illumination and scaled are compared by pixel-by-pixel displacement in column direction and the differences are summed quadratically for each displacement until the displacement at which the sum of the differences is a minimum is found. In step e) according to FIG. 2, this minimum is found at a displacement of about 0 pixels. The location of the best match to subpixels can be interpolated exactly from the curve of the error sum. The pixel-by-pixel subtraction of the images to be compared should be carried out for displacements $\Delta s$ in a range of up to a maximum 10 pixels in each direction.

The magnitude of the displacement $\Delta s$ in a given device construction depends upon the objective used, upon the specimen (reflecting or transparent) and to a small extent upon the wavelength and adjusted state of the device.

All factors are determined by design with the exception of the adjustment state and can be determined in high-quality microscopes by interrogating the adjusted configuration or can be determined by calibration. The resulting value determined for the displacement $\Delta s$ of the two images is accordingly proportional to the amount of the deviation $\Delta z$ from the optimum focal plane and can be calculated.

Figure 3:
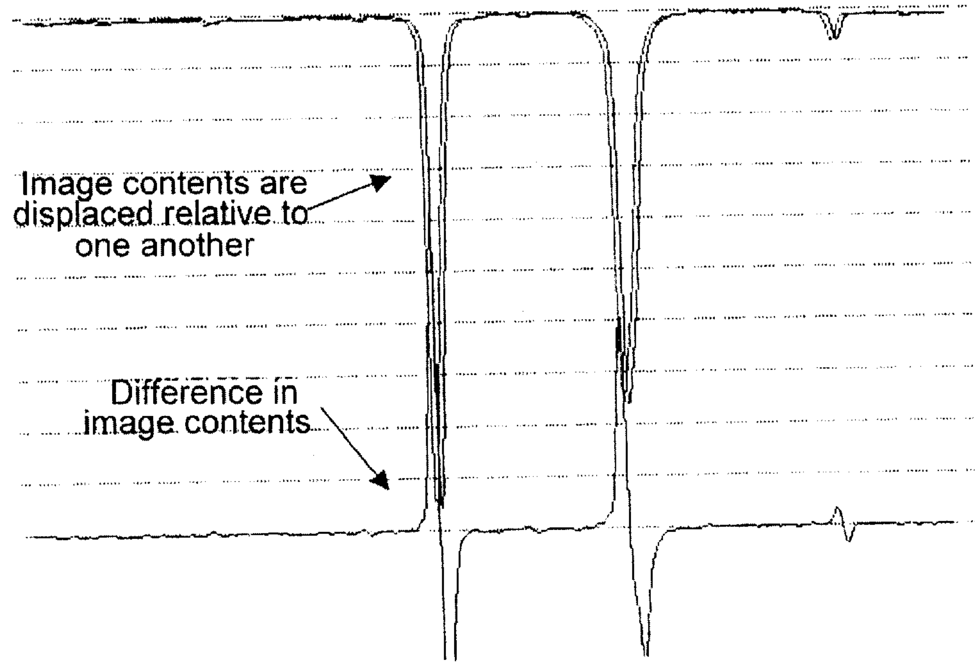
FIG. 3 shows the image contents of the images to be compared, with a displacement by −3 pixels.
Figure 4:
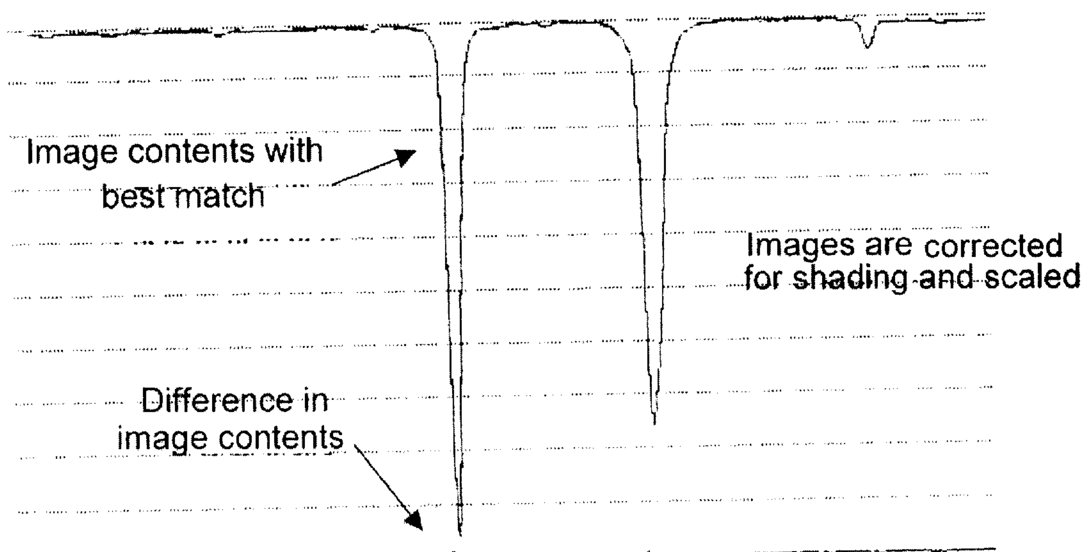
FIG. 4 shows the image contents of the images to be compared, with a displacement by 0 pixels.
Figure 5:
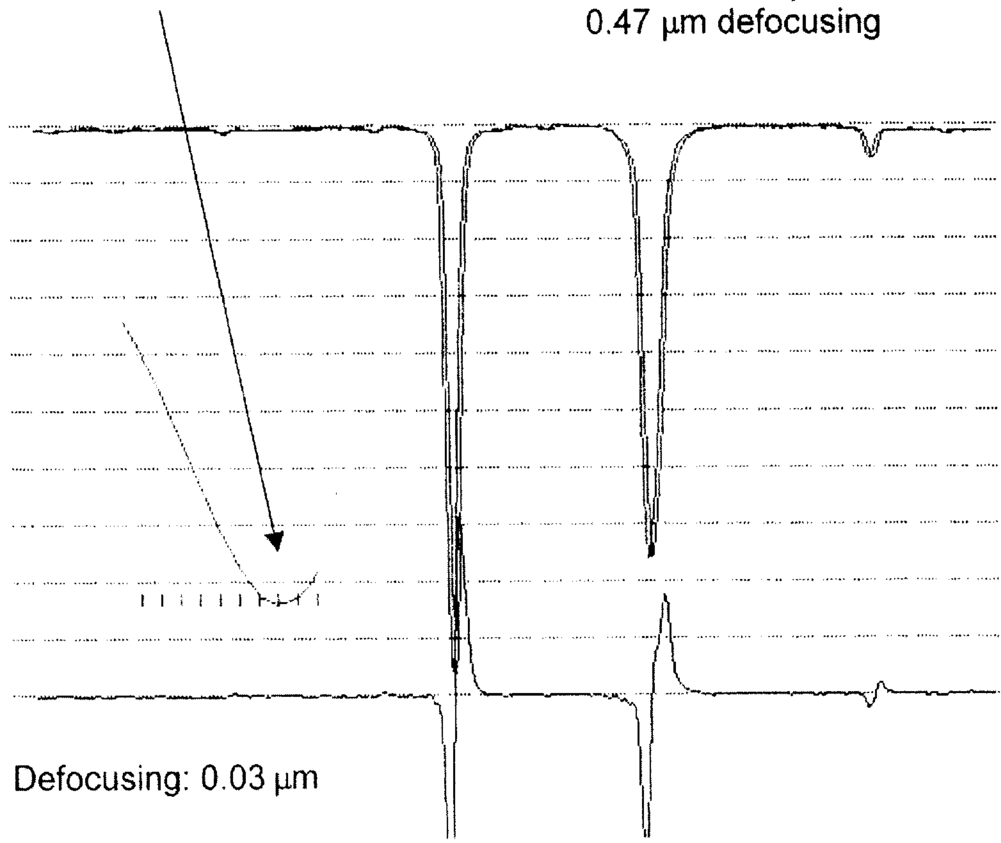
FIG. 5 shows the image contents of the images to be compared, with a displacement of +3 pixels, with the curve of the error sum.

Focusing is optimum with a displacement of the two images of $\Delta s=0$ as is shown in the example according to FIG. 4. In contrast, with a displacement of the two images of $\Delta s \neq 0$, there is a defocusing by a distance proportional to $\Delta s$. FIG. 3 and FIG. 5 show displacements $\Delta s$ by +3 pixels and −3 pixels by way of example.

In order to accelerate the process, it is advantageous to average the columns before compensating the differences in illumination and brightness between the image contents of the images to be compared. Therefore, only image sections of 512×1 pixels need be processed in the further method steps. This does not impair the accuracy of the method for monitoring focus in a microscope.

Further, the method according to the invention for monitoring focus is also applicable when rotation of the transparent optical component 4 results in a displacement of the beam bundle from position 9*a* to position 9*b* at an angle $\beta$ relative to the main scanning or main image direction. In this connection, the checking of the correlation of the image contents is carried out in the direction of beam displacement by means of pixel-by-pixel displacement, but separately in direction of the main scanning direction or main image direction (x-axis) and in direction of the image plane (y-axis) vertical thereto. The compensation of the differences in illumination and brightness and the pixel-by-pixel subtraction for each displacement $\Delta s$ carried out in pixel steps is likewise carried out separately in direction of the x-axis and y-axis. The determination of the resulting displacement $\Delta S_{Res}$ in direction of angle $\beta$ is determined by means of the results of the displacement $\Delta s$ determined in both directions using the Pythagorean theorem.

A value for the deviation $\Delta z$ from the optimum focal plane is determined from the displacement $\Delta s$ that can be interpolated exactly from the error sum to subpixels.

Figure 6:
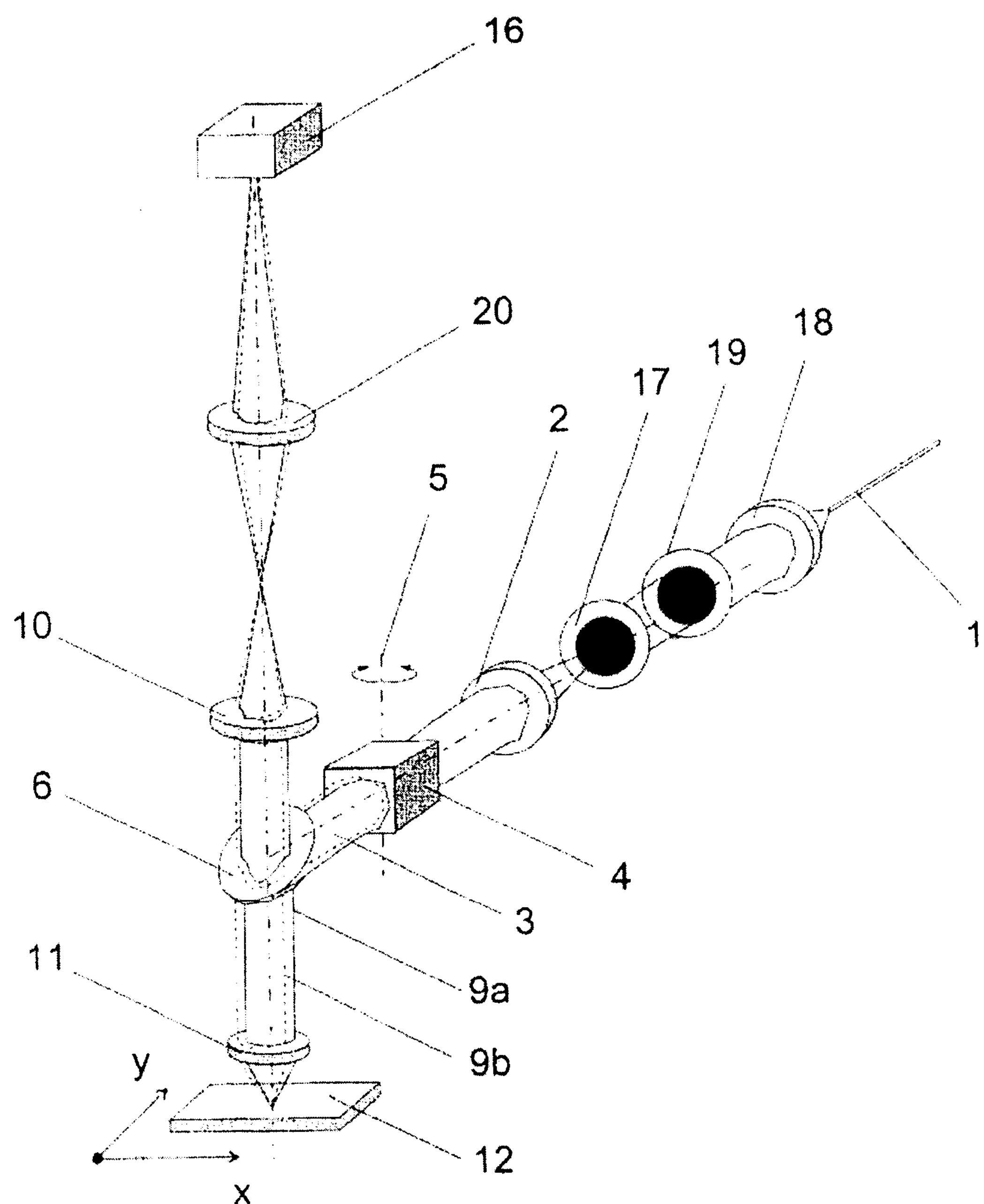
FIG. 6 is a schematic view showing the construction of a microscope with a CCD matrix and the arrangement according to the invention.

In the arrangement shown in FIG. 6 for focus monitoring in a microscope with CCD matrix 16, the illumination light 1 reaches the specimen 12 via a lens 18, an aperture diaphragm 19, a field diaphragm 17, a collimator 2, a beam splitter 6 which is partially transparent with respect to intensity or spectrum, and an objective 11. The beam reflected by the specimen 12 reaches the CCD matrix 16 via the objective 11, the beam splitter 6, the tube lens 10 and preferably by a zoom system 20. A light source or laser source can be used as illumination source. In addition to this known arrangement, a transparent optical component 4 is arranged in the area of the parallel illumination beam path 3 in front of the beam splitter 6 in such a way that the mean perpendicular of the beam entrance surface lies parallel to the centroid of the illumination light 1. The transparent optical component 4 has the shape of a square or a cylinder with a thickness from 10 to 25 mm in the direction of the illumination light 1 and is rotatable by means of a centrally controlled motor, preferably a stepping motor. During rotation, the mean perpendicular of the beam entrance surface encloses an angle $\alpha$ with the centroid of the illumination light 1. The axis of rotation 5 of the transparent optical component 4 is preferably situated in relation to the specimen 12 in such a way that a displacement of the beam bundle (9*a* to 9*b*) is carried out in the main scanning image direction. The axis of rotation 5 is accordingly oriented to the CCD matrix 16 in y-direction. The beam bundle is accordingly displaced from position 9*a* to position 9*b*. The control of the transparent optical component 4, the processing of the recorded images, the acquisition of all output data, and the calculation and evaluation of the results are carried out by a central controlling and evaluating unit (not shown).

In the method for focus monitoring, the image section of about 16 rows and 512 column contains the relevant object data. The required images are recorded at a high zoom. A high zoom means that a smaller object area is imaged in the selected image section of 512×16 pixels. In a microscope with a CCD matrix, this is realized by an optical zoom. The zoom system 20 can be dispensed with when a sufficiently large focal length of the tube lens 10 is selected.

The transparent optical component 4 is not rotated during normal image processing, i.e., the mean perpendicular of the beam entrance surface lies parallel to the centroid of the illumination light 1. For monitoring focus, the transparent optical component 4 is rotated so that the mean perpendicular of the beam entrance surface encloses an angle $\alpha$ with the centroid of the illumination light 1.

A first image is recorded with the transparent optical component 4 rotated by angle $\alpha_1 \approx +20°$ and a second image is recorded with the transparent optical component 4 rotated by angle $\alpha_2 \approx -20°$. A third image is recorded in addition, also with the transparent optical component 4 rotated by angle $\alpha_1 \approx +20°$, for suppression of drift influences. A condition for the images to be recorded is: $\alpha_1 = -\alpha_2$.

The mean column value determined from the first image and third image is checked by the central controlling and evaluating unit for correlation of the image contents with the second image in the direction of the beam displacement by pixel-by-pixel displacement. The value determined corresponding to the description in FIG. 1 for the displacement $\Delta s$ of the two images is accordingly proportional to the amount of the deviation $\Delta z$ from the optimum focal plane and can likewise be calculated.

By means of the arrangement according to the invention, focus monitoring can be implemented very quickly and simply also between the normal work processes. A change in the illumination device or evaluating device is not required for this purpose. The monitoring of a refocusing carried out beforehand is possible at any time without a great expenditure of time by evaluating preferably three images.

The sensitivity of the method depends on the orientation of the structures of the specimen to be examined and is maximum in structures extending perpendicular to the main scanning or main image direction, very good in punctiform structures and minimal in structures extending in the main scanning or main image direction.

While the foregoing description and drawings represent the present invention, it will be obvious to those skilled in the art that various changes may be made therein without departing from the true spirit and scope of the present invention.

What is claimed is:

1. An arrangement for focus monitoring in a microscope with digital image generation, comprising:

a parallel illumination beam path being provided in front of a main beam splitter arranged in the beam path;

a transparent optical component with parallel beam entrance and beam exit surfaces being arranged in the area of said parallel illumination beam path in front of said main beam splitter in such a way that the mean perpendicular of the beam entrance surface lies parallel to the centroid of the illumination light;

said transparent optical component being supported so as to be rotatable and the mean perpendicular of the beam entrance surface encloses an angle $\alpha$ with the centroid of the illumination light during rotation;

said axis of rotation of said transparent optical component being situated in relation to a specimen in such a way that a displacement of the beam bundle is carried out in the main scanning direction or main image direction during rotation; and a central controlling and evaluating unit being provided for controlling the transparent optical component, for processing the recorded images, for acquisition of all output data, and for calculating and evaluating the results.

2. The arrangement of claim 1, wherein the microscope is a confocal microscope.

3. An arrangement for focus monitoring in a microscope according to claim 1, wherein the transparent optical component has the shape of a plane plate, a cube, a square or a cylinder, and wherein the transparent optical component has a centrally controlled motor, preferably a stepping motor.

4. The arrangement for focus monitoring in a microscope according to claim 1, wherein a laser scanning device is arranged in the main beam path behind the main beam splitter for digital image generation.

5. The arrangement for focus monitoring in a microscope according to claim 1, wherein a CCD matrix is arranged in the beam path behind the zoom system as a receiver for digital image generation.

6. A method for focus monitoring with digital image generation, in a confocal microscope, particularly for operation of an arrangement according to claim 1, in which the image section contains the relevant object data, comprising:

recording the images required for the focus monitoring with a high zoom and with a pinhole having an aperture greater than one Airy;

recording a first image of the relevant object data recorded with a transparent optical component that is rotated by angle $+\alpha$;

recording a second image of the relevant object data with a transparent optical component that is rotated by angle $-\alpha$;

compensating the two images with respect to their differences in illumination and brightness;

checking the two images for correlation of image contents in the direction of the beam displacement by pixel-by-pixel displacement;

exactly interpolating the displacement $\Delta s$ at which the correlation has a maximum as the location of the best match to subpixels; and determining a value for the deviation $\Delta z$ from the optimum focal plane from this displacement $\Delta s$ while taking into account the given output values.

7. The method for focus monitoring in a microscope according to claim 6, wherein a third image of the relevant object data is recorded with a transparent optical component rotated by angle $+\alpha$, wherein the average column value is determined from the third image and the first image, wherein the average value of the first and third images with the second image is checked for correlation of image contents in the direction of the beam displacement by pixel-by-pixel displacement.

8. The method for focus monitoring in a microscope according to claim 6, wherein a zoom of approximately 5.6 to 8 is adjusted, so that the image length in the intermediate image plane is approximately 1 mm, and wherein the pinhole is opened to approximately 4 to 5 Airy.

9. The method for focus monitoring in a microscope according to claim 6, wherein the angle $\alpha$ has a value of approximately 20°, so that the centroid of the illumination light in the objective pupil can be displaced by approximately half of the radius of the objective pupil, and wherein the condition $\alpha_1=-\alpha_2$ applies.

10. The method for focus monitoring in a microscope according to claim 6, wherein the compensation of the differences in illumination and brightness and the correlation of the image contents of the images are carried out wherein the differences in illumination between the right-hand image border and the left-hand image border in both images are mathematically compensated by averaging an area of about 10 to 15 pixels, wherein the minimum and maximum brightness is determined in the two corrected images and the images are scaled, wherein the contents of these images which are corrected for illumination and scaled are subtracted one from the other pixel by pixel for each displacement $\Delta s$ carried out in pixel steps, and wherein the sum of the squares of the respective difference values is determined for every displacement $\Delta s$ as an error sum.

11. The method for focus monitoring in a microscope according to claim 6, wherein the columns are averaged before compensating for the differences in illumination between the image contents.

12. The method for focus monitoring in a microscope according to claim 6, wherein the pixel-by-pixel subtraction of the contents of the images which are corrected for illumination and scaled is carried out for displacements $\Delta s$ in an area of up to 10 pixels in every direction.

13. The method for focus monitoring in a microscope according to claim 6, wherein the location of the minimum is exactly interpolated from the curve of the error sum which corresponds to a parabola in a very close approximation in the vicinity of the minimum.

14. The method for focus monitoring in a microscope according to claim 16, wherein for images in which the rotation of the transparent optical component results in a displacement of the beam bundle (from 9a to 9b) at an angle $\beta$ relative to the main scanning direction or main image direction;

carrying out the checking of the correlation of the image contents in the direction of beam displacement also by pixel-by-pixel displacement, but separately in the direction of the main scanning direction or main image direction and in direction of the image plane vertical thereto;

carrying out the compensation of the differences in illumination and brightness and the pixel-by-pixel subtraction for each displacement $\Delta s$ carried out in pixel steps separately in direction of the main scanning direction or main image direction and in direction of the image plane vertical thereto;

determining the displacement $\Delta s_{Res}$ in direction of angle $\beta$ by the results of the determination of the displacement $\Delta s$ carried out in both directions using the Pythagorean theorem;

exactly interpolating the displacement $\Delta s$ in which the error sum has a minimum as the location of the best match to subpixels; and determining a value for the deviation $\Delta z$ from the optimum focal plane from this displacement $\Delta s$ while taking into account the given output values.

* * * * *